United States Patent

Suzuki

[15] 3,700,917

[45] Oct. 24, 1972

[54] COUNT-DOWN CIRCUIT USING A TUNNEL DIODE

[72] Inventor: Koji Suzuki, Tokyo, Japan

[73] Assignee: Iwassaki Tsushinki Kabushiki Kaisha (also known as Iwatsu Electric Co., Ltd.), Tokyo-to, Japan

[22] Filed: May 14, 1971

[21] Appl. No.: 143,367

[30] Foreign Application Priority Data

May 18, 1970 Japan ......................45/42312

[52] U.S. Cl. ...............................307/225 B, 307/286

[51] Int. Cl. .............................................H03k 21/00

[58] Field of Search.....307/220 B, 222 B, 223 B, 225 B, 307/226 B, 224 B, 286

[56] References Cited

UNITED STATES PATENTS

| | | | |
|---|---|---|---|
| 3,124,706 | 3/1964 | Alexander | 307/286 X |
| 3,165,647 | 1/1965 | De Bottari et al. | 307/223 B |
| 3,350,576 | 10/1967 | Zimmerman | 307/225 B |
| 3,530,315 | 9/1970 | Kaufman | 307/286 |
| 3,569,733 | 3/1971 | Weischedel | 307/222 B |

*Primary Examiner*—John S. Heyman

*Attorney*—Robert E. Burns and Emmanuel J. Lobato

[57] ABSTRACT

A count-down circuit using a tunnel diode for counting down a repetition frequency of an input pulse signal applied from an input terminal to one electrode of the tunnel diode so as to produce a counted-down output from an output terminal connected to said one electrode of the tunnel diode, in which a series-connection comprising a resistor and a collector-emitter path of a transistor is connected to the output terminal. A bias current is applied through at least a part of the series-connection and the tunnel diode so that an operating point of the tunnel diode is maintained in a low-voltage region. A pulse generator is connected to a path between the input terminal and the tunnel diode for generating a pulse having a repetition period equal to an integer multiple of a repetition period of the input pulse signal in synchronism with the input pulse signal. A bistable circuit is connected to the base of the transistor so as to be set in response to each output pulse of the pulse generator and reset until a just succeeding one of output pulses of the pulse generator.

3 Claims, 15 Drawing Figures

PRIOR ART

COUNT-DOWN CIRCUIT USING A TUNNEL DIODE

This invention relates to count-down circuits using a tunnel diode used in a sampling oscilloscope by way of example.

For example, a count-down circuit using a tunnel diode is employed in a sampling oscilloscope to count-down a frequency of an input signal. However, conventional count-down circuits are difficult to adjust to an optimum condition and are affected by change of conditions in the room temperature etc.

An object of this invention is to provide a count-down circuit capable of eliminating the above-mentioned defects of conventional circuits and operable in a stable condition without trouble adjustments against the change of conditions and the characteristic deviations in constructive elements.

Other objects and principles, constructions and operations of this invention will be understood from the following detailed discussion taken in conjunction with the accompanying drawings, in which the same or equivalent parts are designated by the same reference numerals, characters and symbols, and in which.

Figure 1:
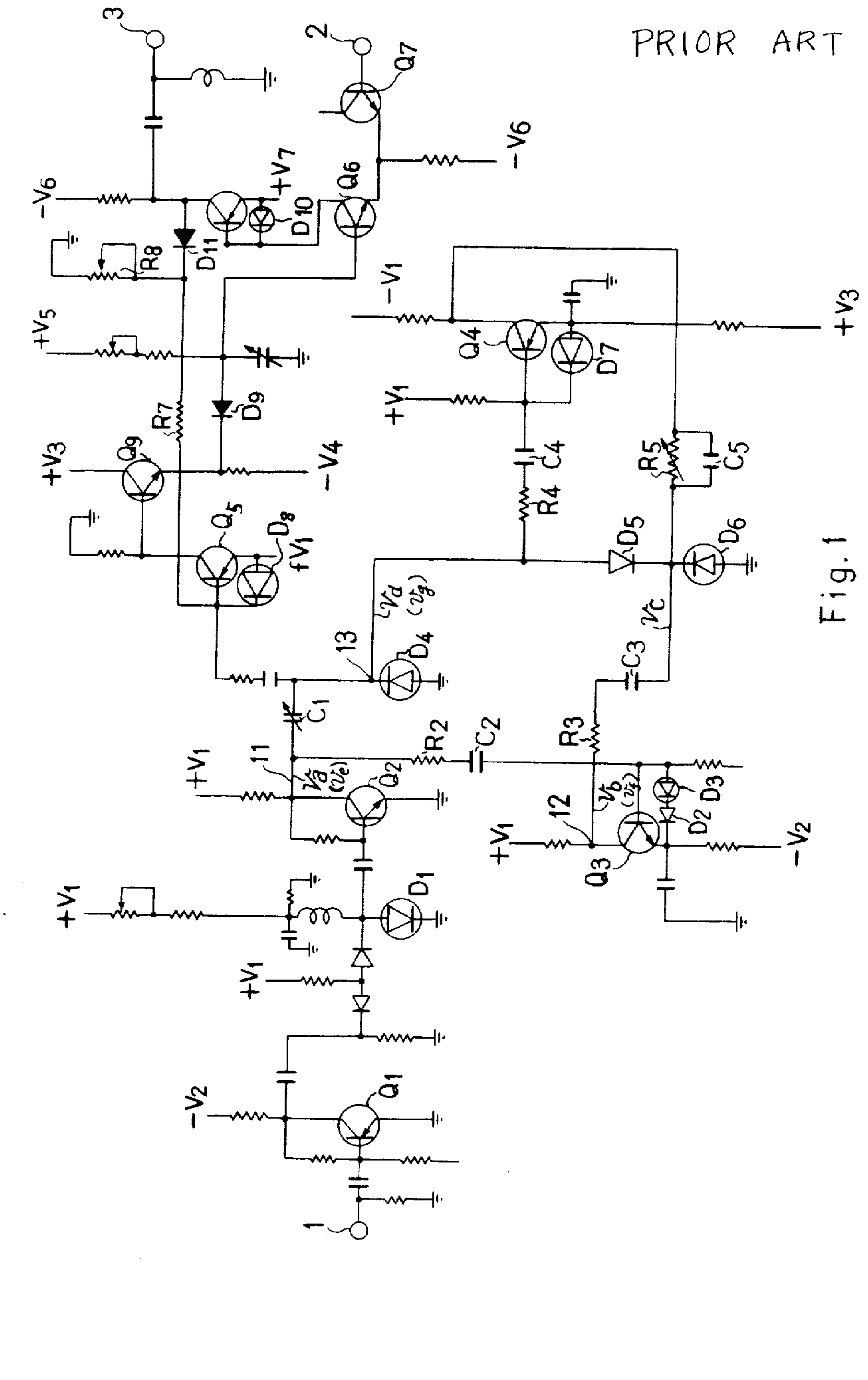
PRIOR ART Fig. 1
FIG. 1 is a connection diagram illustrating a conventional count-down circuit employed in a synchronous circuit of a sampling oscilloscope.
Figure 2:
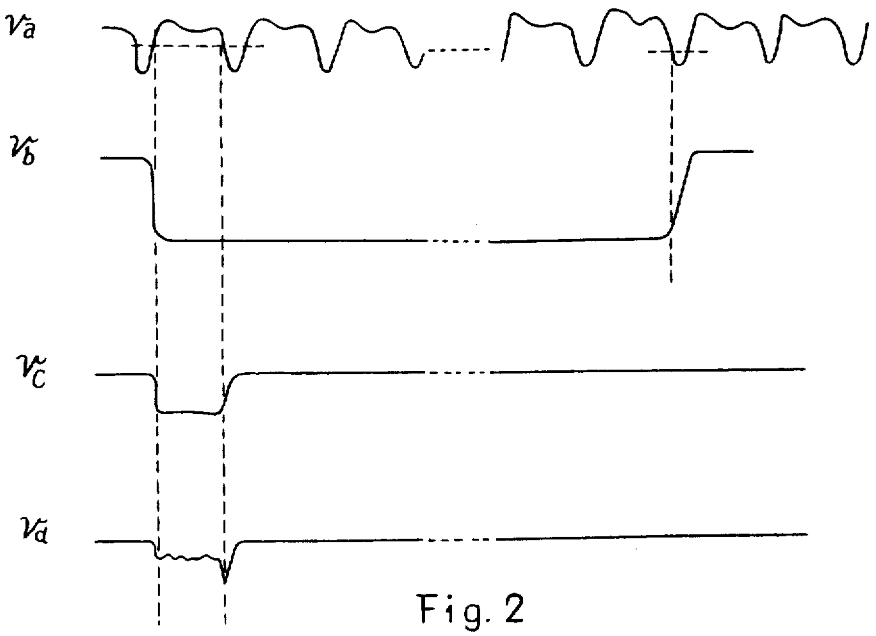
FIG. 2 is a waveform diagram explanatory of the operations of the circuit shown in FIG. 1.
Figures 3A, 3B:
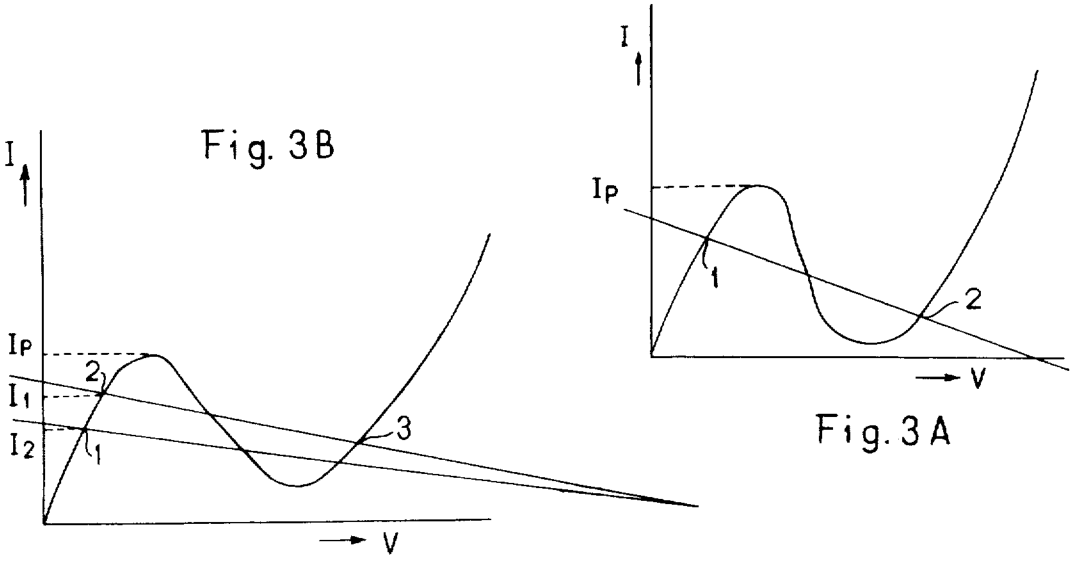
FIGS. 3A and 3B are graphs of characteristic curves explanatory of bias conditions of a tunnel diode used in a circuit shown in FIG. 1.

To clarify differences between conventional techniques and this invention, an example of conventional count-down circuits is at first described with reference to FIGS. 1, 2, 3A, 3B, 4A and 4B. In a synchronizing circuit of FIG. 1 employing a count-down circuit and used in a conventional sampling oscilloscope, a frequency of a signal applied to an input terminal 1 is counted-down to a frequency less than a frequency of 10 mega-Hz and equal to one integral-thereof. The counted-down signal is amplified in a transistor $Q_2$ so as to obtain an amplified signal $v_a$ shown in FIG. 2. An oscillator comprising a transistor $Q_3$ and diodes $D_2$ and $D_3$ has a self-oscillating frequency of 100 KHz and generates negative pulses $v_b$ as shown in FIG. 2 in synchronism with the rise time of the output of the transistor $Q_2$. A tunnel diode $D_6$ is biased so as to have two possible states. On the other hand, a tunnel diode $D_7$ is biased so as to have a mono-stable state and assumes a low-voltage state at a normal condition. In this case, the tunnel diode $D_6$ assumes an operating point 1 on a voltage-current characteristic thereof shown in FIG. 3A in response to the cut-off of a transistor $Q_4$, while the tunnel diode $D_4$ assumes an operating point 1 on a voltage-current characteristic curve thereof shown in FIG. 3B. If an output of the transistor $Q_3$ is applied to the tunnel diode $D_6$ through a resistor $R_3$ and a capacitor $C_3$, the operational point of the tunnel diode $D_6$ is transferred, over a negative-resistance region, to an operating point (2) as shown in FIG. 3A. In FIG. 2, a cathode voltage $v_c$ of the tunnel diode $D_6$ is shown. In response to this transfer of the operational point of the tunnel diode $D_6$, the diode $D_5$ is turned-ON from the cut-off state, while an operating point of the tunnel diode $D_4$ is transferred to an operating point 2 from the operating point 1 shown in FIG. 3B. When a negative output pulse of the transistor $Q_2$ is applied to the tunnel diode $D_4$ through a capacitor $C_1$, the operating point of the tunnel diode $D_4$ is transferred to a stable operating point 3 shown in FIG. 3B over the negative-resistance region. Accordingly, a negative output $v_d$ shown in FIG. 2 appears at the cathode of the tunnel diode $D_4$. A part of the output $v_d$ of the tunnel diode $D_4$ passes through a resistor $R_4$ and a capacitor $C_4$ so as to be converted to a negative pulse $v_d$ shown in FIG. 2, so that an operating point of a tunnel diode $D_7$ is transferred from a low-voltage region to a high-voltage region. In this case, the tunnel diode $D_4$ becomes conductive while the operating point of the tunnel diode $D_6$ returns to the low-voltage region as shown by a point 1 in FIG. 3A. In response to this change, a diode $D_5$ is cut-off while the operating point of the tunnel diode $D_4$ returns to a point 1 shown in FIG. 3A. As mentioned above, a signal obtained by counting down the output of the transistor $Q_2$ below a frequency of 100 KHz can be obtained from a cathode of the tunnel diode $D_4$ in accordance with the monostable operation of a tunnel diode $D_7$. The output of the tunnel diode $D_4$ is further applied to a cathode of a tunnel diode $D_8$ through a resistor $R_6$ and a capacitor $C_8$. This tunnel diode $D_8$ is employed as a bistable circuit. When the operating point of the tunnel diode $D_8$ is transferred to a high-voltage region in response to the output of the tunnel diode $D_4$, a transistor $Q_5$ assumes conductive from a cut-off state while a diode $D_9$ is cut-off from a conductive state. Accordingly, a high-speed saw-tooth wave can be obtained from a base of a transistor $Q_6$. This transistor $Q_6$ compares the high-speed saw-tooth wave with a low-speed saw-tooth wave applied to a terminal 2 for generating from an output terminal 3 an output pulse, a part of which is returned through a diode $D_{11}$ and a resistor $R_7$ to the tunnel diode $D_8$ to restore it to the low-voltage region. If this circuit is employed in a sampling oscilloscope, the output pulse of the terminal 3 is employed as a sampling command pulse for generating a sampling pulse.

The above-mentioned circuit is so designed that jitters are reduced in counting down a signal of about 10 Mega-Hz, obtained by counting down at the diode $D_1$, below a signal of 100 Kilo-Hz. However, the above-mentioned circuit is difficult to adjust to an optimum condition and is readily affected by change of conditions in the room temperature etc. Reasons therefore are as follows.

Figure 4A:
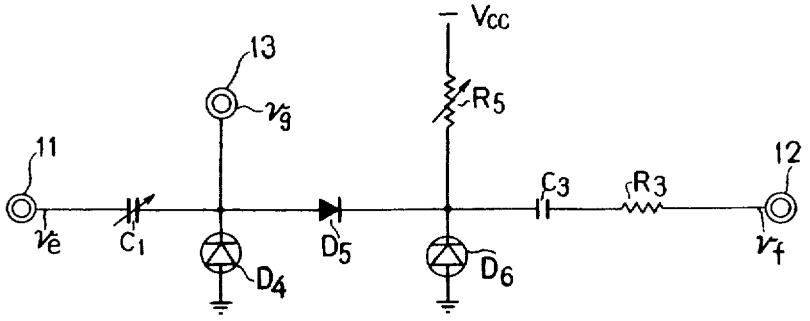
FIG. 4A is a connection diagram illustrating a main part of a circuit shown in FIG. 1.

A part of the circuit, shown in FIG. 1, for counting down the output of the diode $D_1$ below a low frequency signal of 100 Kilo-Hz can be briefly illustrated as shown in FIG. 4A. In this case, the output $v_e$ of the transistor $Q_2$ is applied to a terminal 11, and a negative output pulse $v_f$ of a collector of the transistor $Q_3$ having a repetition frequency less than a frequency of 100 Kilo-Hz and synchronized with a rise time of the transistor $Q_2$ is applied to a terminal 12. The operating point of the tunnel diode $D_4$ is transferred from the low-voltage region to the high-voltage region in response to a rise time of the output $v_e$ of the transistor $Q_2$ applied to the terminal 11, only when the operating point of the tunnel diode $D_6$ is transferred to the high-voltage region in response to the pulse $v_f$ applied to the terminal 12. The output $v_g$ from the tunnel diode $D_4$ is obtained from a terminal 13. In this case, if the bias voltage for the bistable states of the tunnel diode $D_6$ is reduced so as to increase the level of the pulse $v_f$ of the terminal 12, an overflow current may be passed through a diode $D_5$ and the tunnel diode $D_4$ after converting the operating point of the tunnel diode $D_6$ from the low-voltage region to the high-voltage region. This overflow current has a dangerous chance for transferring the operating point of the tunnel diode $D_4$ from the low-voltage region to the high-voltage region. Accordingly, the bias voltage of the tunnel diode must be sufficiently large to avoid the above mentioned overflow current while the level of the pulse $v_f$ applied to the terminal 12 must be small. In other words, a considerable current is passed to the tunnel diode $D_4$ through the diode $D_5$ even if the operating point of the tunnel diode $D_6$ assumes the low-voltage region. Accordingly, it is very difficult to determine the value of the capacitor $C_1$ so that the level $i$ of a pulse applied from the terminal 11 to the tunnel diode $D_4$ through a capacitor $C_1$ satisfy the following relationship:

$$|I_p - I_2| < i < |I_p - I_1| \quad (1)$$

Moreover, since the level of the pulse $v_e$ applied to the terminal 11 is not constant, it is very difficult to determine the value of the capacitor $C_1$ so as to always satisfy the condition shown by the equation (1). Moreover, since the bias voltage for the bistable states of the tunnel diode $D_6$ depends upon respective characteristics of the diodes $D_4$ and $D_5$ we well as values of the tunnel diode $D_6$, a resistor $R_5$ and a source voltage $V_{cc}$, the value of the resistor $R_5$ must be precisely determined after completion of a combination of the diodes $D_4$, $D_5$ and $D_6$. The operations of the tunnel diode $D_4$ closely depends upon the bias voltage of the diode $D_6$ as mentioned above. Accordingly, skilled techniques and a sufficient time are necessary for adjustment of the capacitor $C_1$ and the register $R_5$ since this adjustment must be simultaneously performed for the capacitor $C_1$ and the register $R_5$. Moreover, since respective voltage-current characteristics of the diodes $D_4$, $D_5$ and $D_6$ are affected in response to change of conditions, such as the room temperature, this circuit cannot continue a correct operation under fluctuations of conditions even if respective values of the capacitor $C_1$ and the resistor $R_5$ are adjusted to optimum values. Furthermore, since the output $V_g$ of the tunnel diode $D_4$ assumes a small level, the operating point of the tunnel diode $D_8$ employed as a bistable multivibrator is necessarily determined so as to be close to the current $I_p$ on the low-voltage region, while a resistor $R_8$ must be adjusted so as to avoid transfer of the diode $D_8$ to the high-voltage region in response to noise in a path from the cathode of the tunnel diode $D_4$ to the cathode of the tunnel diode $D_8$.

Figure 5:
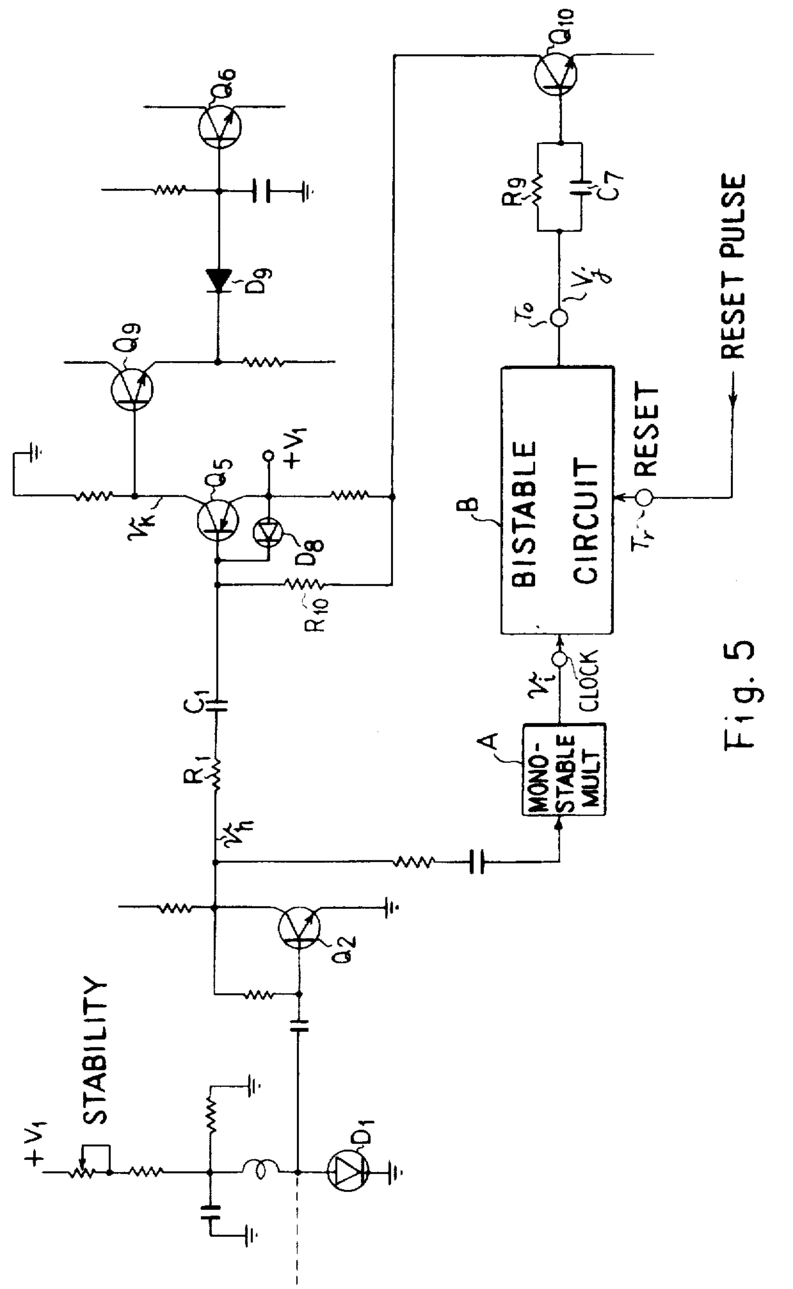
FIG. 5 is a circuit diagram illustrating an embodiment of this invention.
Figure 6:
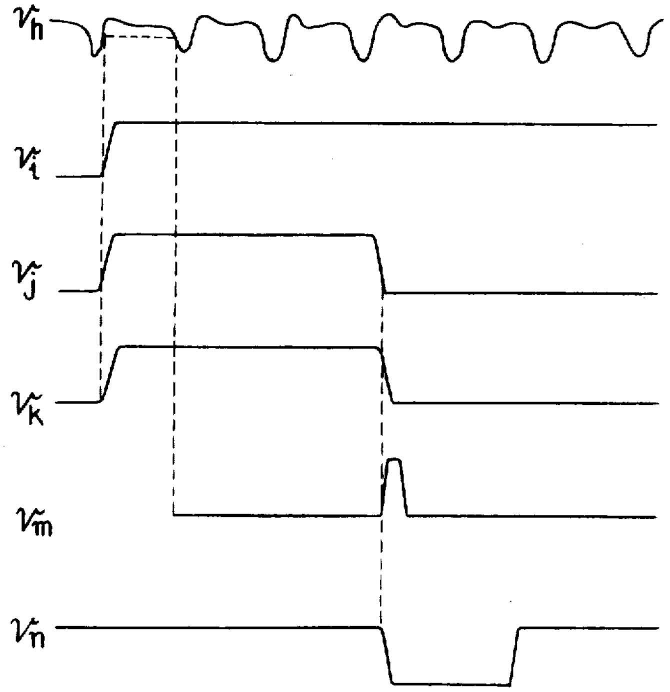
FIG. 6 is a waveform diagram explanatory of the operations of a circuit shown in FIG. 5.
Figure 7:
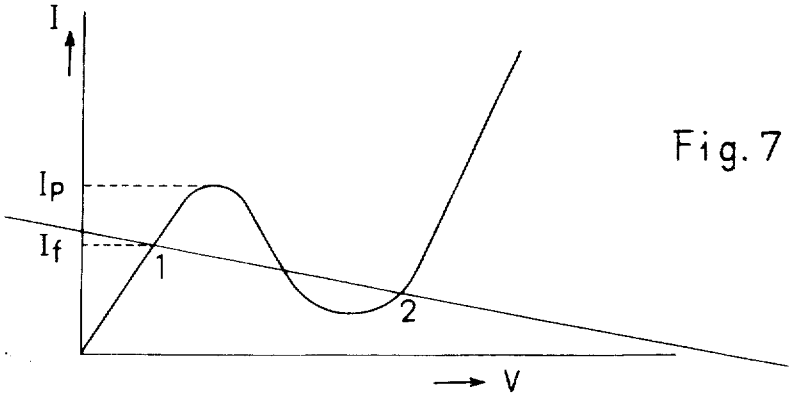
FIG. 7 is a graph of a characteristic curve explanatory of bias conditions of a tunnel diode used in a circuit shown in FIG. 5.

With reference to FIGS. 5, 6 and 7, an embodiment of this invention for eliminating the above-mentioned defects of the conventional count-down circuit is now described. In this embodiment, diodes $D_1$ and $D_9$ and transistors $Q_2$ and $Q_9$ perform the same operations as those of elements $D_1$, $D_9$, $Q_2$ and $Q_2$ shown in FIG. 1. A mono stable multivibrator A is connected to a path between the tunnel diode $D_8$ and the input terminal $tv_1$ has a repetion period of about 10 micro-seconds and synchronized with an input signal of a frequency more than 20 Mega-Hz by way of example or may be an oscillator of about 100 Kilo-Hz. A bistable circuit B is set to a high output state of an output terminal $T_o$ in response to a positive clock pulse $v_i$ when a reset terminal $T_r$ assumes a high level, while reset to a low output state in response to a negative reset pulse applied to the reset terminal $T_r$. As understood from a waveform $v_i$ and $v_h$ shown in FIG. 6, the monostable multivibrator A generates a positive pulse $v_i$ in response to a forward edge or a rear edge of an output $v_h$ of the transistor $Q_2$. When the output pulse $v_i$ is applied to the clock terminal of the bistable circuit B, a positive pulse $v_j$ is obtained at the output terminal $T_o$ as shown in FIG. 6 so that a transistor $Q_{10}$ becomes conductive from a cut-off state. No current is passed through a tunnel diode $D_8$ when the transistor $Q_{10}$ is cut-off, so that this tunnel diode $D_8$ is not transferred over a negative negative-resistance region to a high-voltage region even if the output of the transistor $Q_2$ is applied thereto through a resistor $R_1$ and a capacitor $C_1$. However, if the transistor $Q_{10}$ becomes conductive, a current flows through a path: a source or input terminal $+V_1$, the tunnel diode $D_8$, a resistor $R_{10}$, the transistor $Q_{10}$ and the ground. Accordingly, the tunnel diode $D_8$ is biased so as to have one of two possible states on a voltage-current characteristic shown in FIG. 7, and an operating point of the tunnel diode $D_8$ is restored to a point 1 in a low-voltage region. In this case, if the negative output pulse $v_h$ of the transistor $Q_2$ is applied to the tunnel diode $D_8$, the operating point of the tunnel diode $D_8$ is transferred over the negative-resistance region to a point (2) shown in FIG. 7. In response to this change of the tunnel diode $D_8$, the transistor $Q_5$ becomes conductive so that an output pulse $v_k$ is obtained a collector of the transistor $Q_5$. Thereafter, a sampling command pulse $v_m$ shown in FIG. 6 is obtained in a manner similar to the operations described with reference to FIG. 1. A part of the sampling command pulse $v_m$ is applied to the reset terminal $T_r$ of the bistable circuit B to reset it to the low output state.

An example of elemental construction of this invention is described with reference to FIG. 8A. In this example, a circuit A is an oscillator of a repetition period $P_o$ or a monostable circuit, which generates a positive pulse $v_i$ as shown in FIG. 6 in synchronism with the rise time of an input signal of a repetion period $t$. The repetition period P of the output pulse of the circuit A is therefore equal to a value $n \cdot t$ and substantially equal to the repetition period $P_o$; where $n$ is an integer. In other words, the frequency of the input signal is counted down to one $n$-th. In this case, since the output pulse of the circuit A has jitters and delay times with respect to the input signal, this output pulse cannot be employed as they are for a synchronizing circuit used in a sampling oscilloscope etc. A circuit B is a bistable circuit, which is set to a high output state in response to the output pulse of the circuit A and reset to a low output state in response to a reset pulse obtained from the output thereof. A tunnel diode $D_8$ is maintained to a low-voltage region, even if an input signal is applied to this diode $D_8$, in a case where a collector-emitter path of a transistor $Q_{10}$ connected to the tunnel diode $D_8$ through a resistor $R_{10}$ is cut-off. If the bistable circuit B is set to the high output state and the transistor $Q_{10}$ becomes conductive, a current is passed through a path: a source terminal $+V_1$, the tunnel diode $D_8$, the resistor $R_{10}$, the transistor $Q_{10}$ and the ground. Accordingly, the tunnel diode $D_8$ is biased to a low-voltage region in two possible stable states, and then transferred to a high voltage region over a negative-resistance region when a negative pulse of the input signal is applied thereto. A part of the output resets the bistable circuit B as mentioned above. This reset may be performed by another control pulse until a next pulse from the circuit A.

Figure 8A:
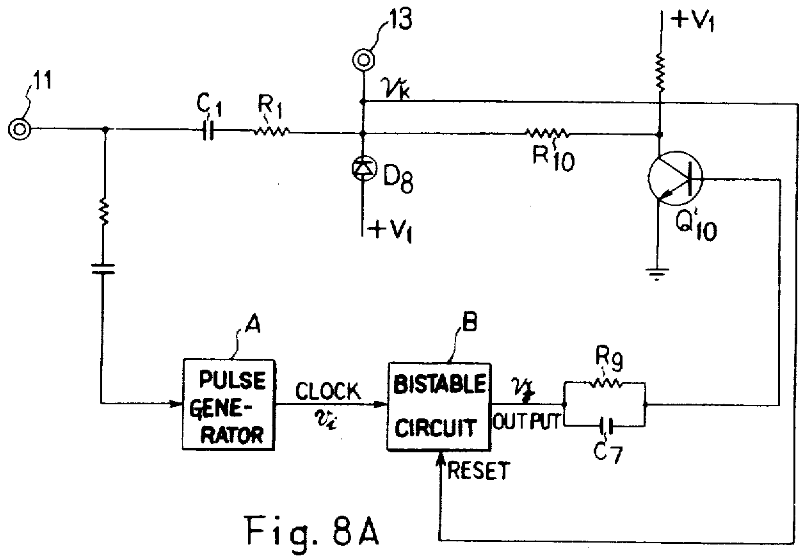
FIGS. 8A, 8B, 8C, 8D, 8E and 8F are circuit diagrams each illustrating an embodiment of this invention.
Figure 8B:
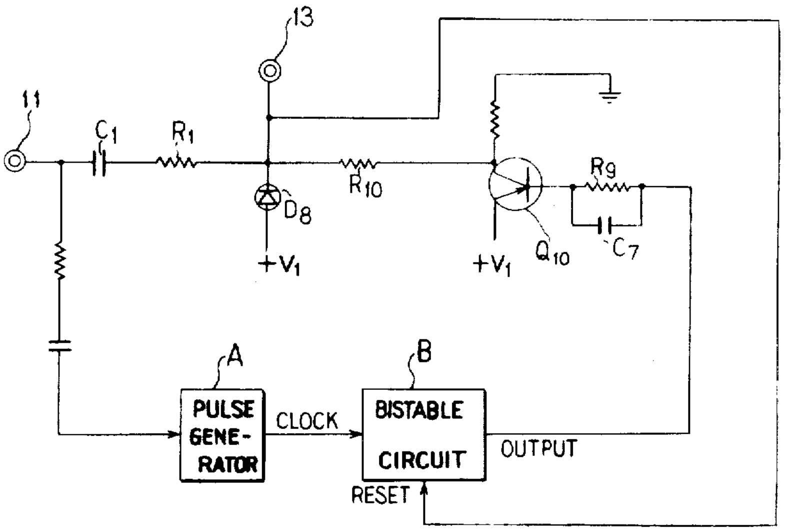

If the transistor $Q_{10}$ is a NPN transistor, the example shown in FIG. 8A is modified as shown in FIG. 8B, in which the conductive direction of the collector-emitter path of the transistor $Q_{10}$ is directed in a direction from the source terminal $+V_1$ to the ground.

Figure 8C:
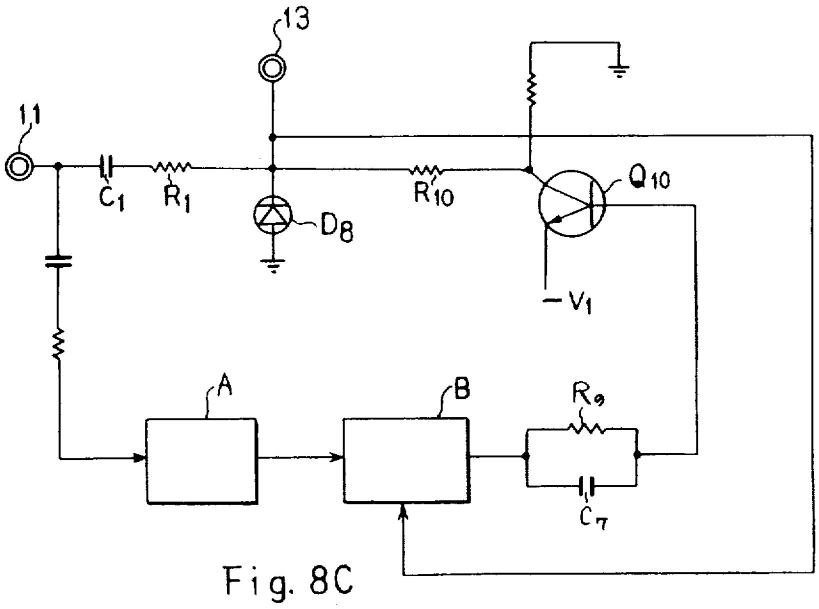
Figure 8D:
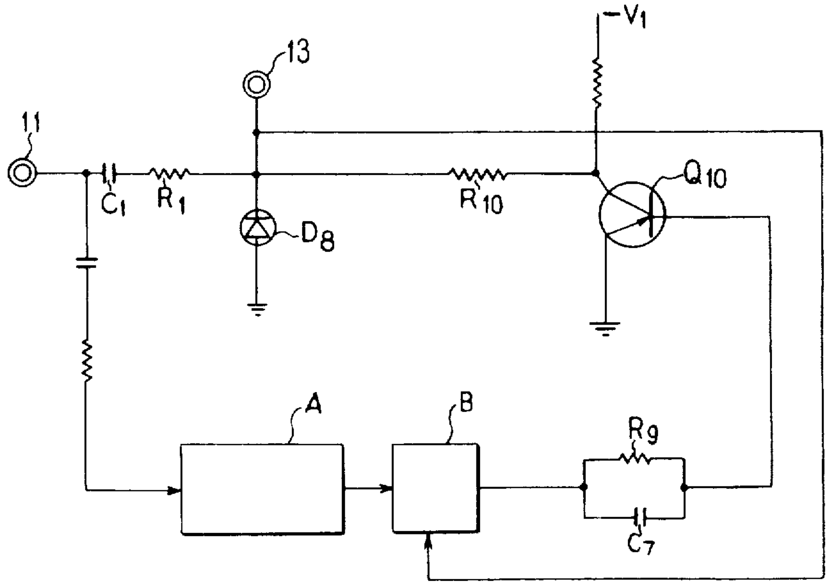

If the anode of the tunnel diode $D_8$ is connected to the ground, the polarity of the bias voltage $V_1$ is negative as shown in FIGS. 8C and 8D.

Figure 8E:
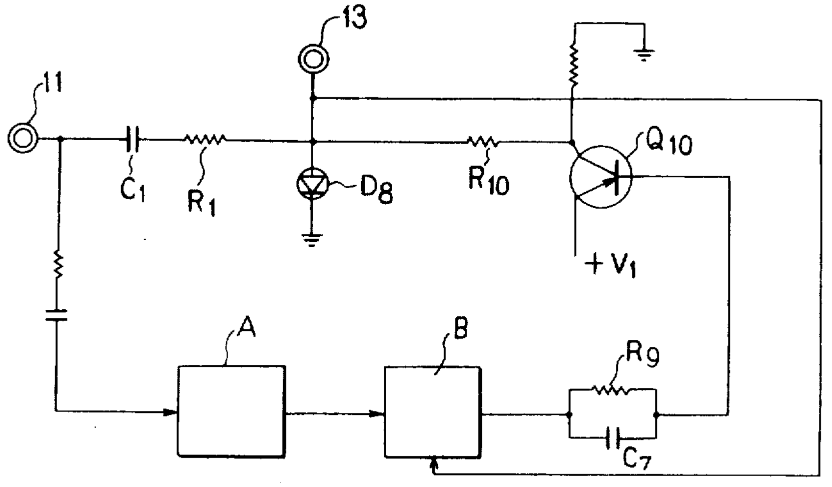
Figure 8F:
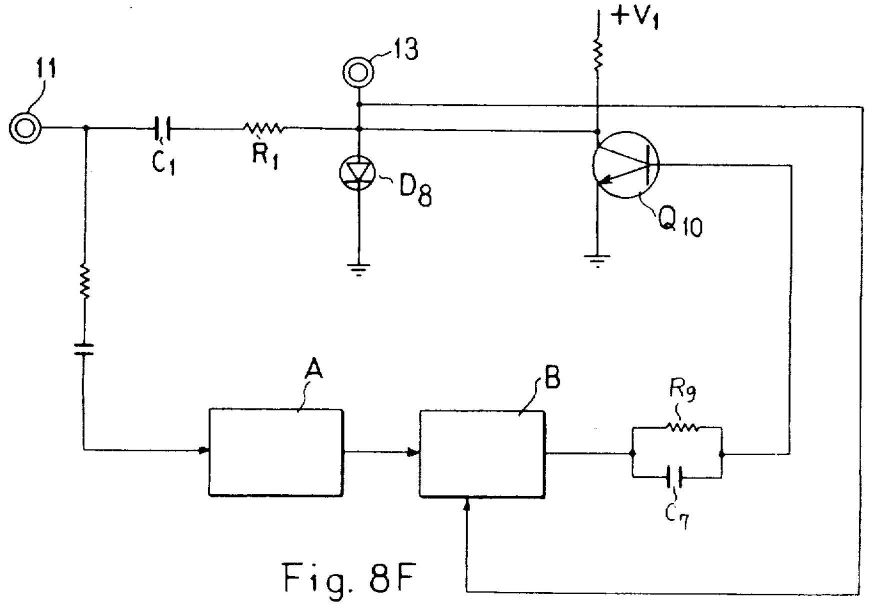

The output terminal 13 may be provided at the anode of the tunnel diode $D_8$ as shown in FIGS. 8E and 8F.

Merits of this invention against the conventional circuit shown in FIG. 1 can be summarized as follows:

1. The operations of the countdown circuit circuit of this invention are very stable. In other words, since no current is passed through the tunnel diode $D_8$ if the transistor $Q_{10}$ is cut-off, the tunnel diode $D_8$ is maintained in a low-voltage region unless a current more than a current $I_p$ is supplied from the transistor $Q_2$ in this condition. While the tunnel diode $D_8$ is biased so as to assume one of two possible states as shown in FIG. 7 when the transistor $Q_{10}$ is conductive, a load line for this condition is determined by the source voltage $V_1$ and the value of the resistor $R_{10}$. Accordingly, fluctuations because of the room temperature variations etc are very small. Since the level *i* of the negative input pulse is sufficient to satisfy the following relationship:

$$|I_p - I_1| < i < I_p \quad (2)$$

to continue normal operations, the normal operations can be continued for considerable fluctuations of the level of the output of the transistor $Q_2$. Accordingly, adjustments of the elements $R_1$, $C_1$ and $R_{10}$ are not at all necessary.

2. Since the output of the transistor $Q_2$ is directly applied to the tunnel diode $D_8$ through the elements $R_1$ and $C_1$ only, delay times and jitters are very small.

Figure 4B:
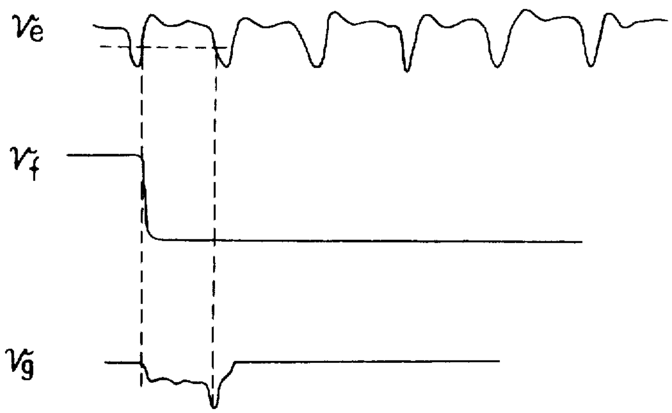
FIG. 4B is a waveform diagram explanatory of the operations of a circuit shown in FIG. 4A.

The above-mentioned merits of this invention are briefly caused by elimination of means described with reference to FIGS. 4A and 4B.

What I claim is:

1. A count-down circuit, comprising: a tunnel diode; input terminal means for applying an input pulse signal to one electrode of an anode and a cathode of the tunnel diode; means defining an electrical path from of input terminal means to said tunnel diode; output terminal means connected to said one electrode of the tunnel diode for deriving therefrom an output pulse signal whose repetition frequency corresponds to a counted-down frequency of the repetition frequency of said input pulse signal; a series-connection connected to said output terminal means and comprising a resistor and a collector-emitter path of a transistor; bias means for passing a necessary bias current through said collector-emitter path, said resistor and said tunnel diode so that an operating point of said tunnel diode is maintained in a low-voltage region; a pulse generator connected to said input terminal means in a branch connection from said electrical path between said input terminal to said tunnel diode for generating a pulse having a repetition period equal to an integer multiple of a repetition period of the input pulse signal in synchronism with each one of the leading edges and the trailing edges of the input pulse signal; and a bistable circuit connected between the output of said pulse generator and the base of said transistor, the bistable circuit being set in response to each output pulse of said pulse generator and reset until a just succeeding one of output pulses of said pulse generator.

2. A count-down circuit according to claim 1, in which said bistable circuit comprises a reset input and including means connecting said output terminal means to the reset input of said bistable circuit to reset the bistable circuit in response to each one of said output pulses.

3. A count-down circuit according to claim 1, in which said pulse generator is a monostable multivibrator.

* * * * *